US012392603B2

(12) United States Patent
Fang et al.

(10) Patent No.: US 12,392,603 B2
(45) Date of Patent: Aug. 19, 2025

(54) OPTICAL FIBER SENSING METHOD AND SENSING SYSTEM FOR STRAIGHTNESS OF SCRAPER CONVEYOR

(71) Applicants: China University of Mining and Technology, Xuzhou (CN); Yongkang Weichuang Optoelectronic Technology Co., Ltd., Jinhua (CN); Xuzhou Weidean Optoelectronic Technology Co., Ltd., Xuzhou (CN)

(72) Inventors: Xinqiu Fang, Xuzhou (CN); Ningning Chen, Xuzhou (CN); Minfu Liang, Xuzhou (CN); Gang Wu, Xuzhou (CN); Haotian Feng, Xuzhou (CN); Yang Song, Xuzhou (CN); Dexing He, Xuzhou (CN); Chunyang Fang, Jinhua (CN); Fukang Qiao, Xuzhou (CN); Yang Wu, Xuzhou (CN)

(73) Assignees: CHINA UNIVERSITY OF MINING AND TECHNOLOGY, Xuzhou (CN); YONGKANG WEICHUANG OPTOELECTRONIC TECHNOLOGY CO., LTD., Jinhua (CN); XUZHOU WEIDEAN OPTOELECTRONIC TECHNOLOGY CO., LTD., Xuzhou (CN)

( * ) Notice: Subject to any disclaimer, the term of this patent is extended or adjusted under 35 U.S.C. 154(b) by 0 days.

(21) Appl. No.: 18/925,107

(22) Filed: Oct. 24, 2024

(65) Prior Publication Data
US 2025/0172385 A1 May 29, 2025

(30) Foreign Application Priority Data
Nov. 29, 2023 (CN) .......................... 202311610065.3

(51) Int. Cl.
*G01B 11/24* (2006.01)
*G01B 11/27* (2006.01)
*G01L 1/24* (2006.01)

(52) U.S. Cl.
CPC .............. *G01B 11/24* (2013.01); *G01B 11/27* (2013.01); *G01L 1/246* (2013.01)

(58) Field of Classification Search
CPC .......... G01B 11/24; G01B 11/27; G01L 1/246
See application file for complete search history.

(56) References Cited

U.S. PATENT DOCUMENTS

2012/0143523 A1* 6/2012 Chen ....................... G01L 1/246
702/42
2022/0026920 A1 1/2022 Ebrahimi Afrouzi et al.
2022/0144554 A1* 5/2022 Xu .......................... G01B 11/24

FOREIGN PATENT DOCUMENTS

CN     1495408 A    5/2004
CN   111811427 A   10/2020
(Continued)

OTHER PUBLICATIONS

Butov et al., All-Fiber Highly Sensitive Bragg Grating Bend Sensor, MDPI Sensors, 2019 (Year: 2019).*
Fang et al., Research on key technique of straightness perception of scraper conveyor based on fiber grating, Coal Science and Technology, Jan. 2019 (Year: 2019).*
Fang English Translation (Year: 2019).*
(Continued)

*Primary Examiner* — Kyle R Quigley
(74) *Attorney, Agent, or Firm* — Li & Cai Intellectual Property Office

(57) ABSTRACT

An optical fiber sensing method and sensing system for straightness of the scraper conveyor is provided. The sensing method includes the following steps: obtaining the horizontal strain and vertical strain of the corresponding grating measuring point of the scraper conveyor by the optical fiber shape sensor; calculating the horizontal curvature and vertical curvature of the grating measuring point; inserting multiple interpolation nodes between the curvature values of (Continued)

two adjacent grating measuring points; transforming the horizontal curvature and the vertical curvature into the horizontal coordinate value in the horizontal coordinate system and the vertical coordinate value in the vertical coordinate system respectively; superimposing the horizontal coordinate value and the vertical coordinate value to obtain the three-dimensional spatial coordinate values of the grating measuring point and the interpolation node; and obtaining the curves of the optical fiber shape sensor on the horizontal plane, the vertical plane, and the three-dimensional space respectively.

9 Claims, 6 Drawing Sheets

(56) References Cited

FOREIGN PATENT DOCUMENTS

| CN | 111811434 A | 10/2020 |
|----|-------------|---------|
| CN | 116817797 A | 9/2023  |

OTHER PUBLICATIONS

Floris et al., Twisting measurement and compensation of optical shape sensor based on spun multicore fiber, Mechanical Systems and Signal Processing, 2020 (Year: 2020).*

Gander et al., Bend measurement using Bragg gratings in multicore fibre, Electronics Letters, 2000 (Year: 2000).*

Kissinger et al., Dynamic Fiber-Optic Shape Sensing Using Fiber Segment Interferometry, Journal of Lightwave Technology, 2018 (Year: 2018).*

Qiao et al., Research on Three-Dimensional Shape Curve Reconstruction Technology for a Scraper Conveyor on an Intelligent Working Face, MDPI Sensors, Oct. 2023 (Year: 2023).*

Sahota et al., Fiber Bragg grating sensors for monitoring of physical parameters: a comprehensive review, Optical Engineering, 2020 (Year: 2020).*

Song et al., Research on Straightness Perception Compensation Model of FBG Scraper Conveyor Based on Rotation Error Angle, MDPI Sensors, 2022 (Year: 2022).*

Fang Xinqiu, et al., Key technologies of optical fiber accurate perception and straightening of straightness of the scraper conveyor, Journal of Mining & Safety Engineering, 2023, pp. 1043-1056, vol. 40, No. 5.

* cited by examiner

OPTICAL FIBER SENSING METHOD AND SENSING SYSTEM FOR STRAIGHTNESS OF SCRAPER CONVEYOR

CROSS REFERENCE TO THE RELATED APPLICATIONS

This application is based upon and claims priority to Chinese Patent Application No. 202311610065.3, filed on Nov. 29, 2023, the entire contents of which are incorporated herein by reference.

TECHNICAL FIELD

The invention relates to the field of the optical fiber sensing technology, especially to the optical fiber sensing method and sensing system for straightness of a scraper conveyor.

BACKGROUND

The attitude monitoring and collaborative control of three-machine equipment in the mining field is one of the important components of the intelligent coal mine. The supporting equipment of three machines includes the shearer, the scraper conveyor and the hydraulic support, the collaborative operation of three machines jointly completes the production process of cutting coal, transporting coal, and supporting the roof of the mining field. The scraper conveyor undertakes the task of transporting coal on the working face, and is also the fulcrum of the running track of the shearer and the pushing process of the hydraulic support. Ensuring that the coal wall, scraper conveyor, and hydraulic support are in a straight line is not only the stipulation of Coal Mine Safety Regulations but also one of the important assessment indicators for intelligent mine construction. The intelligent coordination of three-machine equipment solves the intelligent coordination problem between the shearer and the hydraulic support, the intelligent coordination problem between the shearer and the scraper conveyor, and the intelligent coordination problem between the scraper conveyor and the hydraulic support. Therefore, realizing the intelligent perception and straightening of straightness of the scraper conveyor is also one of the key technical problems to solving the intelligent coordination of the three-machine equipment in the mining field.

Grasping the morphological changes and positioning information of the scraper conveyor in real-time can effectively solve the problems of up and down of the scraper conveyor, leading and lagging of the scraper conveyor head and tail, uneven working face, and so on, there are many methods for straightness perception and straightening of scraper conveyor, the manual straightening method and infrared laser straightening technology are often used in the field. The intelligent technology of straightness perception and straightening of scraper conveyors mainly includes inertial navigation system technology, machine vision measurement technology, digital twin technology, and optical fiber Bragg grating shape sensing technology.

In view of the existing problems of poor reliability, low perception accuracy, and non-real-time perception of scraper conveyor shape perception information, it is urgent to provide an optical fiber sensing method for straightness of the scraper conveyor to solve the above technical problems.

SUMMARY

Aiming at the problems and requirements mentioned above, this scheme proposes an optical fiber sensing method and sensing system for straightness of a scraper conveyor, because the following technical characteristics are adopted, the above technical purposes can be realized, and many other technical effects can be brought.

One purpose of the invention is to propose an optical fiber sensing method for straightness of a scraper conveyor, including the following steps:

S10: setting an optical fiber shape sensor along a scraper conveyor, and obtaining a horizontal strain and a vertical strain of a corresponding grating measuring point of the scraper conveyor by the optical fiber shape sensor; where the optical fiber shape sensor includes a flexible substrate, an optical fiber Bragg grating, and a packaging material, the optical fiber Bragg grating is fixedly encapsulated on a surface of a flexible substrate through the packaging material;

S20: according to a conversion formula of a sensing strain of the optical fiber shape sensor and a bending curvature of a neutral axis of the flexible substrate, calculating a horizontal curvature and a vertical curvature of a grating measuring point;

S30: inserting multiple interpolation nodes between curvature values of two adjacent grating measuring points by discrete interpolation algorithm;

S40: through a slope recursion algorithm, converting each horizontal curvature and each vertical curvature into a horizontal coordinate value in a horizontal coordinate system and a vertical coordinate value in a vertical coordinate system respectively, and superimposing the horizontal coordinate value with the vertical coordinate value to obtain a three-dimensional space coordinate value of the grating measuring point and the interpolation node;

S50: obtaining a curve of the optical fiber shape sensor on a horizontal plane by fitting the horizontal coordinate value, obtaining a curve of the optical fiber shape sensor on the vertical plane by fitting the vertical coordinate value, and obtaining a three-dimensional space curve of the optical fiber shape sensor by fitting the three-dimensional space coordinate value.

In an example of the invention, in S20, when the optical fiber shape sensor bends, the conversion formula between the sensing strain of the optical fiber shape sensor and the bending curvature of the neutral axis of the flexible substrate is as follows:

$$\varepsilon = h \cdot \kappa \cdot \eta$$

where $\varepsilon$ is a sensing strain of the optical fiber shape sensor, h is a vertical distance from the grating measuring point to the neutral axis of the flexible substrate, $\eta$ is a strain transfer efficiency of the optical fiber shape sensor, and $\kappa$ is a curvature of the neutral axis of the flexible substrate.

In an example of the invention, in S20, when the optical fiber shape sensor rotates, the conversion formula between the sensing strain of the optical fiber shape sensor and the bending curvature of the neutral axis of the flexible substrate is as follows:

$$\kappa = \frac{\varepsilon_\theta}{h\eta \cos\theta + \varepsilon_\theta h(1 - \cos\theta)}$$

where $\varepsilon_\theta$ is a sensing strain of the optical fiber shape sensor after rotation, and $\theta$ is a rotation angle of the optical fiber shape sensor, h is a vertical distance from the grating measuring point to the neutral axis of the flexible substrate, η is a strain transfer efficiency of the optical fiber shape sensor, and κ is a curvature of the neutral axis of the flexible substrate.

In an example of the invention, in S20, when the optical fiber shape sensor is twisted, the conversion formula between the sensing strain of the optical fiber shape sensor and the bending curvature of the neutral axis of the flexible substrate is as follows:

$$\kappa = \left[\left(\frac{1}{r} + \frac{\varepsilon_\varphi}{h\eta}\right)^2 - \left(\frac{\varphi}{l}\right)^2\right]^{\frac{1}{2}} - \frac{1}{r}$$

where $\varepsilon_\varphi$ is a sensing strain of the optical fiber shape sensor after torsion, $\varphi$ is a torsion angle of the optical fiber shape sensor, and r is a distance between the optical fiber Bragg grating and a centroid of the flexible substrate, h is a vertical distance from the grating measuring point to the neutral axis of the flexible substrate, η is a strain transfer efficiency of the optical fiber shape sensor, and κ is a curvature of the neutral axis of the flexible substrate.

In an example of the invention, in S30, using a linear interpolation method to insert multiple interpolation nodes between the curvature values of two adjacent grating measuring points, including the following:

firstly, a curvature array on the horizontal plane is denoted as $\kappa_H$, and an arc length array is denoted as $s_H$, a curvature array on the vertical plane is denoted as $\kappa_V$, and the arc length array is denoted as $s_V$; that is:

$$\begin{cases} \kappa_H = [\kappa_{H1}, \kappa_{H2}, \kappa_{H3} \ldots, \kappa_{Hi} \ldots \kappa_{Hn}] \\ s_H = [s_{H1}, s_{H2}, s_{H3} \ldots, s_{Hi} \ldots s_{Hn}] \end{cases}$$

$$\begin{cases} \kappa_V = [\kappa_{V1}, \kappa_{V2}, \kappa_{V3} \ldots, \kappa_{Vi} \ldots \kappa_{Vn}] \\ s_V = [s_{V1}, s_{V2}, s_{V3} \ldots, s_{Vi} \ldots s_{Vn}] \end{cases}$$

then, after interpolation, inserting the interpolation nodes between the curvature values of the original grating measuring points, and obtaining all the curvature values and arc length values after interpolation in a horizontal plane XOY and a vertical plane XOZ, the expression is as follows:

$$\begin{cases} \kappa_H' = [\kappa_{H1}, \kappa_{H11}, \kappa_{H12} \ldots, \kappa_{Hm1}, \kappa_{H2}, \kappa_{H21}, \kappa_{H22} \ldots, \\ \kappa_{Hm2} \ldots, \kappa_{Hi}, \kappa_{Hi1}, \kappa_{Hi2} \ldots, \kappa_{Hmi}, \ldots \kappa_{Hn}] \\ s_H' = [s_{H1}, s_{H11}, s_{H12} \ldots, s_{Hm1}, s_{H2}, s_{H21}, s_{H22} \ldots, \\ s_{Hm2} \ldots, s_{Hi}, s_{Hi1}, s_{Hi2} \ldots, s_{Hmi}, \ldots s_{Hn}] \end{cases}$$

$$\begin{cases} \kappa_V' = [\kappa_{V1}, \kappa_{V11}, \kappa_{V12} \ldots, \kappa_{Vm1}, \kappa_{V2}, \kappa_{V21}, \kappa_{V22} \ldots, \\ \kappa_{Vm2} \ldots, \kappa_{Vi}, \kappa_{Vi1}, \kappa_{Vi2} \ldots, \kappa_{Vmi}, \ldots \kappa_{Vn}] \\ s_V' = [s_{V1}, s_{V11}, s_{V12} \ldots, s_{Vm1}, s_{V2}, s_{V21}, s_{V22} \ldots, \\ s_{Vm2} \ldots, s_{Vi}, s_{Vi1}, s_{Vi2} \ldots, s_{Vmi}, \ldots s_{Vn}] \end{cases}$$

where $\kappa_H'$ is a curvature array on the horizontal plane after interpolation, and $s_H'$ is an arc length array on the horizontal plane after interpolation; $\kappa_V'$ is a curvature array on the vertical plane after interpolation, and $s_V'$ is an arc length array on the vertical plane after interpolation.

In an example of the invention, before S40, it also includes:

determining a coordinate value of a starting point of the optical fiber shape sensor, and determining a tangent slope and curvature of the starting point of the optical fiber shape sensor by an initial calibration of the optical fiber shape sensor, a tangent slope of the ith point and an arc length between the ith point and the (i+1)th point are known, and calculating the tangent slope of the (i+1)th point, where a calculation formula of the tangent slope of the (i+1)th point is as follows:

$$k_{H(i+1)} = \tan[\kappa_{Hi}\Delta s_i + \arctan(k_{Hi})]$$

where $\kappa_{Hi}$ is a curvature of the ith point, $k_{Hi}$ is a tangent slope of the ith point, $\Delta s_i$ is an arc length between the ith point and the (i+1)th point, and $k_{H(i+1)}$ is the slope of the (i+1)th point.

In an example of the invention, S40 includes the following steps:

assuming the curvatures of the ith point and the (i+1)th point on the horizontal plane XOY are $\kappa_{Hi}$ and $\kappa_{H(i+1)}$ respectively, the slopes are $k_{Hi}$ and $k_{H(i+1)}$ respectively, and the coordinates are $(x_{Hi}, y_{Hi})$, $(x_{H(i+1)}, y_{H(i+1)})$ respectively; the angles between the tangent slope of the two points and the x-axis are $\theta_{Hi}$, $\theta_{H(i+1)}$, respectively; $\Delta\theta_{Hi}$ is a change value of the tangential angles of the two points; $\Delta s_i$ is an arc length between two points;

the angle $\theta_{Hi}$ between the tangent slope of the ith point and the x-axis, the angle $\theta_{H(i+1)}$ between the tangent slope of the (i+1)th point and the x-axis, the change value $\Delta\theta_{Hi}$ of the tangential angle of the two points, and the arc length $\Delta s_i$ between the two points can be obtained as follows:

$$\begin{cases} \theta_{Hi} = \arctan(k_{Hi}) \\ \theta_{H(i+1)} = \arctan(k_{H(i+1)}) \\ \Delta\theta_{Hi} = \theta_{H(i+1)} - \theta_{Hi} \\ \kappa_{Hi} = \dfrac{\Delta\theta_{Hi}}{\Delta s_i} \end{cases}$$

from the above formula, the slope of the $(i+1)^{th}$ point can be recursively obtained:

$$k_{H(i+1)} = \tan[\kappa_{Hi}\Delta s_i + \arctan(k_{Hi})]$$

a coordinate change from the ith point to the $(i+1)^{th}$ point is calculated as:

$$\begin{cases} \Delta x_{Hi} = \dfrac{\Delta s_i}{\sqrt{1+k_{Hi}^2}} \\ \Delta y_{Hi} = \dfrac{k_{Hi}\Delta s_i}{\sqrt{1+k_{Hi}^2}} \end{cases}$$

from the above formula, the coordinates of the (i+1)th point are:

$$\begin{cases} x_{H(i+1)} = x_{Hi} + \Delta x_i = x_{Hi} + \dfrac{\Delta s_i}{\sqrt{1+k_{Hi}^2}} \\ y_{H(i+1)} = y_{Hi} + \Delta y_i = y_{Hi} + \dfrac{k_{Hi}\Delta s_i}{\sqrt{1+k_{Hi}^2}} \end{cases}$$

similarly, the $(j+1)^{th}$ point coordinate of the vertical plane XOZ is recursively obtained as follows:

$$\begin{cases} x_{V(j+1)} = x_{Vj} + \Delta x_j = x_{Vj} + \dfrac{\Delta s_j}{\sqrt{1+k_{Vj}^2}} \\ z_{V(j+1)} = z_{Vj} + \Delta z_j = z_{Vj} + \dfrac{k_{Vj}\Delta s_j}{\sqrt{1+k_{Vj}^2}} \end{cases}$$

obtaining coordinate values of the grating measuring point and the three-dimensional space XYZ of the interpolation node by superimposing the corresponding coordinate points on the horizontal plane XOY and the vertical plane XOZ.

In an example of the invention, S50 includes:

taking a first measuring point on the horizontal plane XOY as a coordinate origin, that is $(x_1, y_1)=(0,0)$, obtaining the coordinate set $\{(x_1, y_1), (x_2, y_2) \ldots, (x_w, y_w)\}$ of other points on the XOY plane recursively, finally, connecting the points by a smooth curve, and obtaining a reconstruction curve of the horizontal plane XOY;

taking a first measuring point on the vertical plane XOZ as the coordinate origin, that is, $(x_1, z_1)=(0, 0)$, obtaining the coordinate set $\{(x_1, z_1), (x_2, z_2) \ldots, (x_w, z_w)\}$ of other points on the XOZ plane recursively, finally, connecting the points by a smooth curve, and obtaining a reconstruction curve of the horizontal plane XOZ;

by superimposing the corresponding coordinate points on the horizontal plane XOY and the vertical plane XOZ, obtaining a coordinate set $\{(x_1, y_1, z_1), (x_2, y_2, z_2) \ldots, (x_w, y_w, z_w)\}$ of each point in the three-dimensional space recursively, finally, connecting the points by a smooth curve, and obtaining a reconstruction curve of the three-dimensional space.

Another purpose of the invention is to propose an optical fiber sensing system for straightness of the scraper conveyor, including:

a strain detection module, it is configured to lay the optical fiber shape sensor along the scraper conveyor, and the horizontal strain and vertical strain of the corresponding grating measuring point of the scraper conveyor are obtained by the optical fiber shape sensor; where the optical fiber shape sensor includes a flexible substrate, an optical fiber Bragg grating, and a packaging material, the optical fiber Bragg grating is fixedly encapsulated on the surface of the flexible substrate through the packaging material;

a curvature calculation module, it is configured to calculate the horizontal curvature and vertical curvature of the grating measuring point according to the conversion formula of the sensing strain of the optical fiber shape sensor and the bending curvature of the neutral axis of the flexible substrate;

an interpolation calculation module, it is configured to insert multiple interpolation nodes between the curvature values of two adjacent grating measuring points by a discrete interpolation algorithm;

a coordinate calculation module, it is configured to convert each horizontal curvature and each vertical curvature into the horizontal coordinate value in the horizontal coordinate system and the vertical coordinate value in the vertical coordinate system respectively through the slope recursion algorithm, the horizontal coordinate value is superimposed with the vertical coordinate value to obtain the three-dimensional space coordinate value of the grating measuring point and the interpolation node;

a curve fitting module, it is configured to obtain the curve of the optical fiber shape sensor on the horizontal plane by fitting the horizontal coordinate value, the curve of the optical fiber shape sensor on the vertical plane is obtained by fitting the vertical coordinate value, the three-dimensional space curve of the optical fiber shape sensor is obtained by fitting the three-dimensional space coordinate value.

In an example of the invention, the curvature calculation module includes:

a strain-curvature conversion unit, it is configured to convert the sensing strain of the optical fiber shape sensor to the bending curvature of the neutral axis of the flexible substrate, where the conversion formula is:

$\varepsilon = h \cdot \kappa \cdot \eta$ where $\varepsilon$ is a sensing strain of the optical fiber shape sensor, h is a vertical distance from the grating measuring point to the neutral axis of the flexible substrate, $\eta$ is a strain transfer efficiency of the optical fiber shape sensor, and $\kappa$ is a curvature of the neutral axis of the flexible substrate.

In the following, the optimal embodiment of the invention will be described in more detail in combination with the attached figures, so that the characteristics and advantages of the invention can be easily understood.

BRIEF DESCRIPTION OF THE DRAWINGS

In order to clarify the technical scheme of the embodiment of the invention more clearly, the drawings of the embodiment of the invention are briefly introduced below. The drawings are used only to show some embodiments of the invention and not to limit all embodiments of the invention to them.

MARKS IN THE FIGURES

Figure 1:
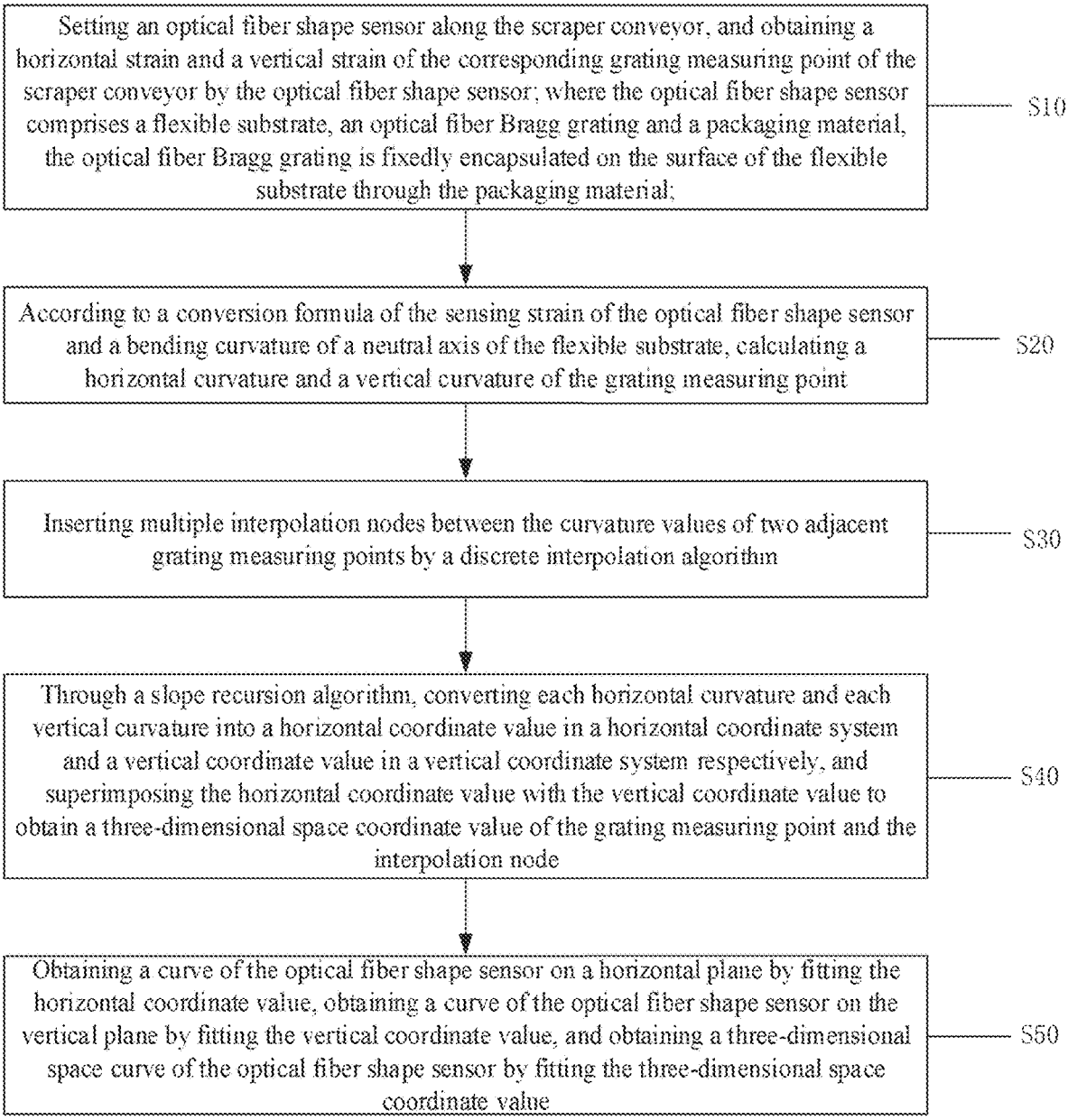
FIG. 1 is a flow chart of the optical fiber sensing method for straightness of the scraper conveyor according to the embodiment of the invention.

Flexible substrate 1;
optical fiber Bragg grating 2;

the first grating 21;
the second grating 22;
the third grating 23;
The fourth grating 24;
packaging material 3.

DETAILED DESCRIPTION OF THE EMBODIMENTS

In order to make the purpose, technical scheme, and advantages of the technical scheme of the invention more clear, the technical scheme of the embodiment of the invention will be clearly and completely described in the following part in combination with the attached figures of the embodiment of the invention. The same mark in the attached figure represents the same component. It should be noted that the embodiment described is part of the embodiment of the invention, not the whole embodiment. Based on the described embodiment of the invention, all other embodiments obtained by ordinary technicians in this field without the need for creative labor belong to the scope of protection of the invention.

Unless otherwise defined, the technical or scientific terms used here shall have the usual meaning understood by persons with general skills in the field to which the invention belongs. The first, second, and similar words used in the application instructions and claims of the invention do not indicate any order, quantity, or importance, but are only used to distinguish different components. Similarly, similar words such as one or a do not necessarily mean quantity limitation. Similar words such as including or comprising mean that the elements or objects in front of the word cover the elements or objects listed after the word and their equivalents, without excluding other elements or objects. Similar terms such as connected or connecting are not limited to physical or mechanical connections, but can include electrical connections, whether direct or indirect. Up, down, left, right, etc. are only used to represent the relative positional relationship when the absolute position of the described object changes, the relative positional relationship may also change accordingly.

According to the first aspect of the invention, an optical fiber sensing method for straightness of the scraper conveyor is shown in FIG. 1, including the following steps:

S10: The optical fiber shape sensor is set along the scraper conveyor, and the horizontal strain and vertical strain of the corresponding grating measuring point of the scraper conveyor are obtained by the optical fiber shape sensor; where the optical fiber shape sensor includes a flexible substrate 1, an optical fiber Bragg grating 2 and a packaging material 3, the optical fiber Bragg grating 2 is fixedly encapsulated on the surface of the flexible substrate 1 through the packaging material 3.

The optical fiber shape sensor can be set along the cable groove of the scraper conveyor, and then the deformation optical signal carried by the optical fiber shape sensor is transmitted to the mine optical fiber analyzer through the mine communication optical cable, the mine optical fiber analyzer converts the optical signal into an electrical signal and transmits it to the mine switch through the mine network, the mine switch transmits the bending information of the scraper conveyor to the ground host computer through the underground ring network, the host computer analyzes and processes the information through the software, showing the two-dimensional shape curve and the three-dimensional shape curve of the scraper conveyor.

Figure 2:
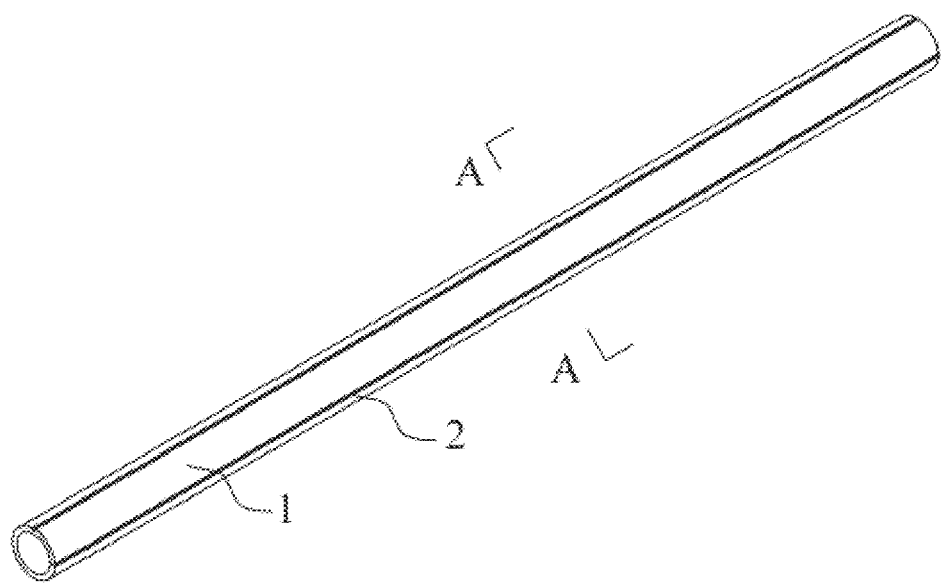
FIG. 2 is a structural diagram of the optical fiber shape sensor according to the embodiment of the invention.
Figure 3:
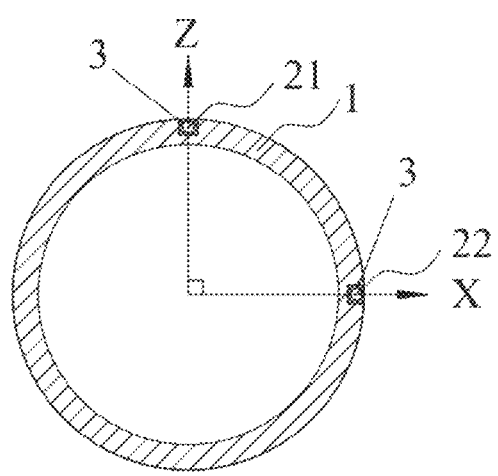
FIG. 3 is a cross-sectional view (two cores) in the A-A direction of one of the embodiments in FIG. 2.

As shown in FIG. 2, it includes the flexible substrate 1, the optical fiber Bragg grating 2, and the packaging material 3, the packaging material 3 can be selected as the binder, and two orthogonally arranged grooves are engraved along the length direction of the flexible substrate 1, the optical fiber Bragg grating 2 is encapsulated in the groove on the surface of the flexible substrate 1 through the packaging material 3, each optical fiber Bragg grating 2 is engraved with multiple gratings. FIG. 3 shows the first grating 21 and the second grating 22, each grating on the first grating 21 or the second grating 22 is arranged at equal intervals and the central wavelength is different.

Preferably, each grating on the first grating 21 and the second grating 22 has the same central wavelength and the same grating spacing. The first grating 21 is arranged on the Z axis to sense the vertical strain of the optical fiber shape sensor, and the second grating 22 is arranged on the X axis to sense the horizontal strain of the optical fiber shape sensor. It should be noted that in the coal mining face, the X-axis direction refers to the tail of the scraper conveyor pointing to the head direction, the Y-axis direction refers to the coal cutting direction of the coal mining face, and the Z-axis direction refers to the direction of the scraper conveyor with the bottom plate. XY is horizontal, and XZ is vertical, both horizontal and vertical are relative positions.

Figure 4:
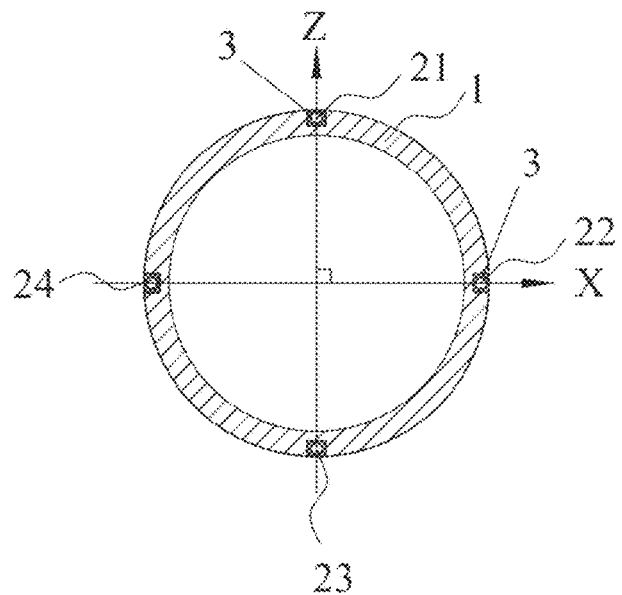
FIG. 4 is a cross-sectional view (four cores) in the A-A direction of another embodiment in FIG. 2.

As shown in FIG. 4, this embodiment provides another four-core optical fiber shape sensor. Four optical fiber Bragg gratings 2 surround a flexible substrate 1 and have a 90° relationship with each other, the optical fiber Bragg grating 2 includes the first grating 21, the second grating 22, the third grating 23, and the fourth grating 24.

Preferably, the gratings on the first grating 21, the second grating 22, the third grating 23, and the fourth grating 24 have the same center wavelength and the same grating spacing. The first grating 21 and the third grating 23 are arranged on the Z axis to sense the vertical strain of the optical fiber shape sensor. The second grating 22 and the fourth grating 24 are arranged on the X-axis to sense the horizontal strain of the optical fiber shape sensor.

Compared with the two-core optical fiber shape sensor in FIG. 3, the four-core optical fiber shape sensor in FIG. 4 has a symmetrical structure, after the deformation of the optical fiber shape sensor, the first grating 21 and the third grating 23, or the second grating 22 and the fourth grating 24 can sense the bending strain of equal size and opposite direction, which can eliminate the change of the central wavelength caused by temperature and realize temperature compensation.

S20: according to the conversion formula of a sensing strain of the optical fiber shape sensor and the bending curvature of the neutral axis of the flexible substrate 1, the horizontal curvature and the vertical curvature of the grating measuring point are calculated;

S30: multiple interpolation nodes between curvature values of two adjacent grating measuring points are inserted by discrete interpolation algorithm;

S40: through the slope recursion algorithm, each horizontal curvature and each vertical curvature are converted into the horizontal coordinate value in the horizontal coordinate system and the vertical coordinate value in the vertical coordinate system respectively, and the horizontal coordinate value is superimposed with the vertical coordinate value to obtain the three-dimensional space coordinate value of the grating measuring point and the interpolation node;

S50: the curve of the optical fiber shape sensor on the horizontal plane is obtained by fitting the horizontal coordinate value, the curve of the optical fiber shape sensor on the vertical plane is obtained by fitting the vertical coordinate value, and the three-dimensional space curve of the optical fiber shape sensor is obtained by fitting the three-dimensional space coordinate value.

The sensing method is based on the optical fiber shape sensing technology to monitor the shape of the scraper conveyor in real-time, the discrete interpolation algorithm and the slope recursion algorithm are used to realize the gradual conversion of the optical fiber center wavelength-strain-bending curvature-measuring point coordinates. The optical fiber Bragg grating 2 sensing accuracy is high, and the curve reconstruction algorithm is scientific and reasonable, which realizes the real-time and high-precision monitoring of the shape of the scraper conveyor.

In an example of the invention, in S20, when the optical fiber shape sensor bends, the conversion formula between the sensing strain of the optical fiber shape sensor and the bending curvature of the neutral axis of the flexible substrate 1 is as follows:

$$\varepsilon = h \cdot \kappa \cdot \eta$$

where $\varepsilon$ is the sensing strain of the optical fiber shape sensor, h is the vertical distance from the grating measuring point to the neutral axis of the flexible substrate, $\eta$ is the strain transfer efficiency of the optical fiber shape sensor, and $\kappa$ is the curvature of the neutral axis of the flexible substrate 1.

Figure 5:
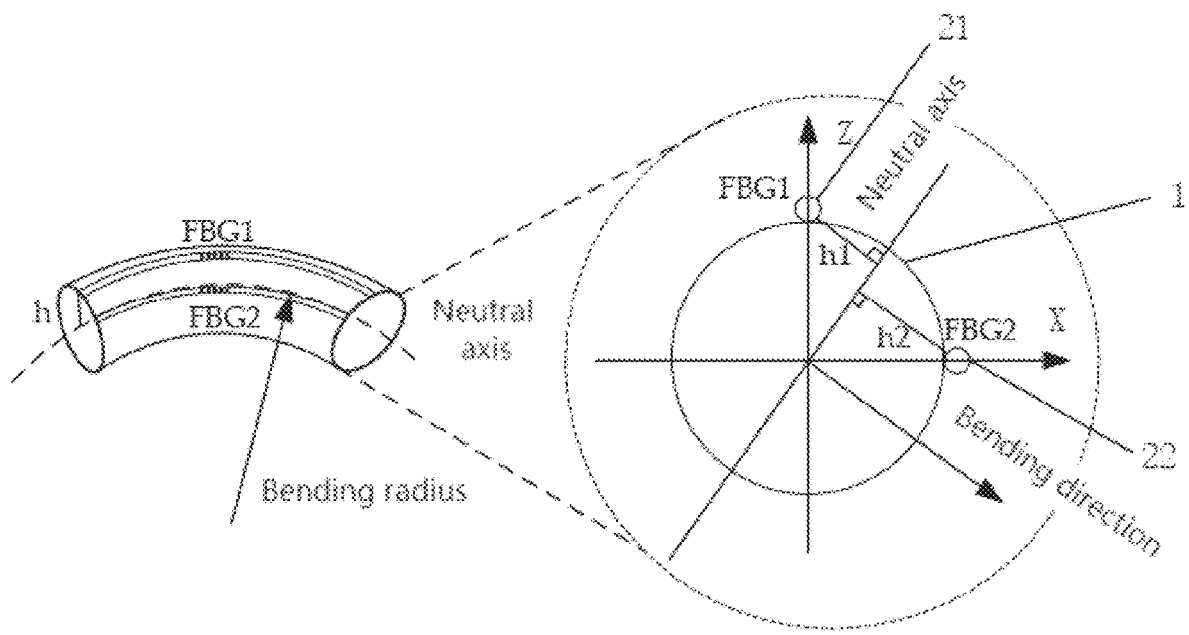
FIG. 5 is a bending force analysis diagram of the optical fiber Bragg grating micro-element segment according to the embodiment of the invention.

As shown in FIG. 5, the principle of optical fiber Bragg grating curvature measurement is based on the pure bending force model, and the influence of rotation and torsion deformation on the sensor itself is not considered. The relationship between the axial strain of the optical fiber Bragg grating sensing unit and the bending curvature of the neutral axis is as follows:

$$\varepsilon = h \cdot \kappa \cdot \eta$$

where $\varepsilon$ is the sensing strain of the optical fiber shape sensor, h is the vertical distance from the grating measuring point to the neutral axis of the flexible substrate, $\eta$ is the strain transfer efficiency of the optical fiber shape sensor, and $\kappa$ is the curvature of the neutral axis of the flexible substrate 1; In FIG. 5, the vertical distance from FBG1 to the neutral axis of flexible substrate 1 is $h_1$, and the vertical distance from FBG2 to the neutral axis of flexible substrate 1 is $h_2$.

In an example of the invention, in S20, when the optical fiber shape sensor rotates, the conversion formula between the sensing strain of the optical fiber shape sensor and the bending curvature of the neutral axis of the flexible substrate 1 is as follows:

$$\kappa = \frac{\varepsilon_\theta}{h\eta \cos\theta + \varepsilon_\theta h(1-\cos\theta)}$$

where $\varepsilon_\theta$ is the sensing strain of the optical fiber shape sensor after rotation, and $\theta$ is the rotation angle of the optical fiber shape sensor, h is the vertical distance from the grating measuring point to the neutral axis of the flexible substrate, $\eta$ is the strain transfer efficiency of the optical fiber shape sensor, and $\kappa$ is the curvature of the neutral axis of the flexible substrate.

Figure 6:
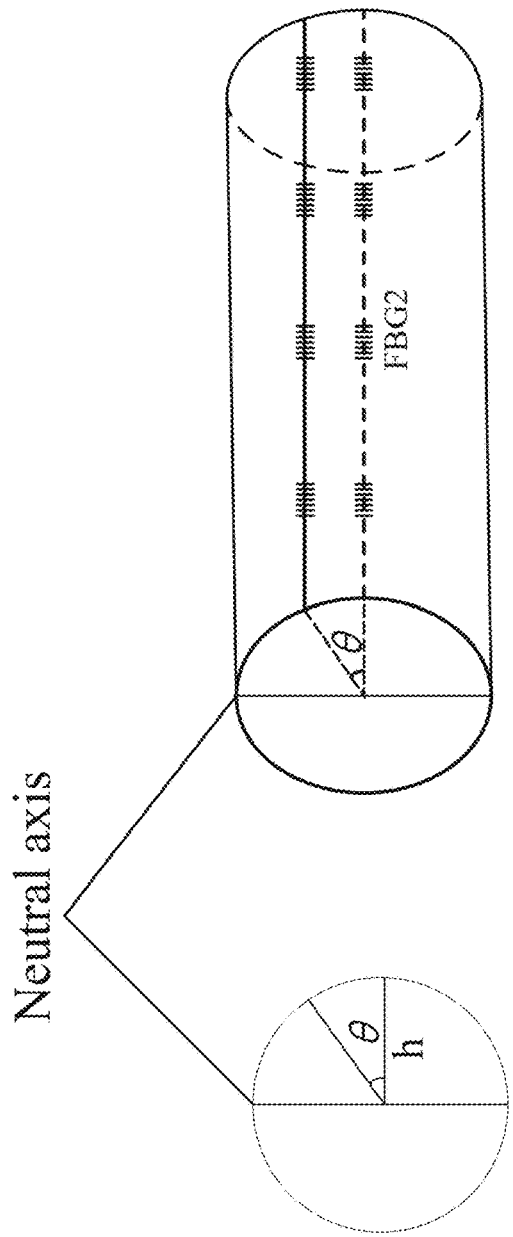
FIG. 6 is a geometric model diagram of the optical fiber Bragg grating micro-element segment under the bending and rotating conditions according to the embodiment of the invention.

As shown in FIG. 6, after the rotation of the optical fiber shape sensor, the rotation angle must be considered when calculating the relationship between the center wavelength of the optical fiber Bragg grating 2 and the curvature. When the optical fiber shape sensor rotates, the position of the grating measuring point deviates from the neutral axis, and the above formula (the formula of optical fiber shape sensor when bends) is no longer applicable.

In an example of the invention, in S20, when the optical fiber shape sensor is twisted, the conversion formula between the sensing strain of the optical fiber shape sensor and the bending curvature of the neutral axis of the flexible substrate 1 is as follows:

$$\kappa = \left[\left(\frac{1}{r}+\frac{\varepsilon_\varphi}{h\eta}\right)^2 - \left(\frac{\varphi}{l}\right)^2\right]^{\frac{1}{2}} - \frac{1}{r}$$

where $\varepsilon_\varphi$ is the sensing strain of the optical fiber shape sensor after torsion, $\varphi$ is the torsion angle of the optical fiber shape sensor, and r is the distance between the optical fiber Bragg grating and the centroid of the flexible substrate 1, h is the vertical distance from the grating measuring point to the neutral axis of the flexible substrate, $\eta$ is the strain transfer efficiency of the optical fiber shape sensor, and $\kappa$ is the curvature of the neutral axis of the flexible substrate 1.

Figure 7:
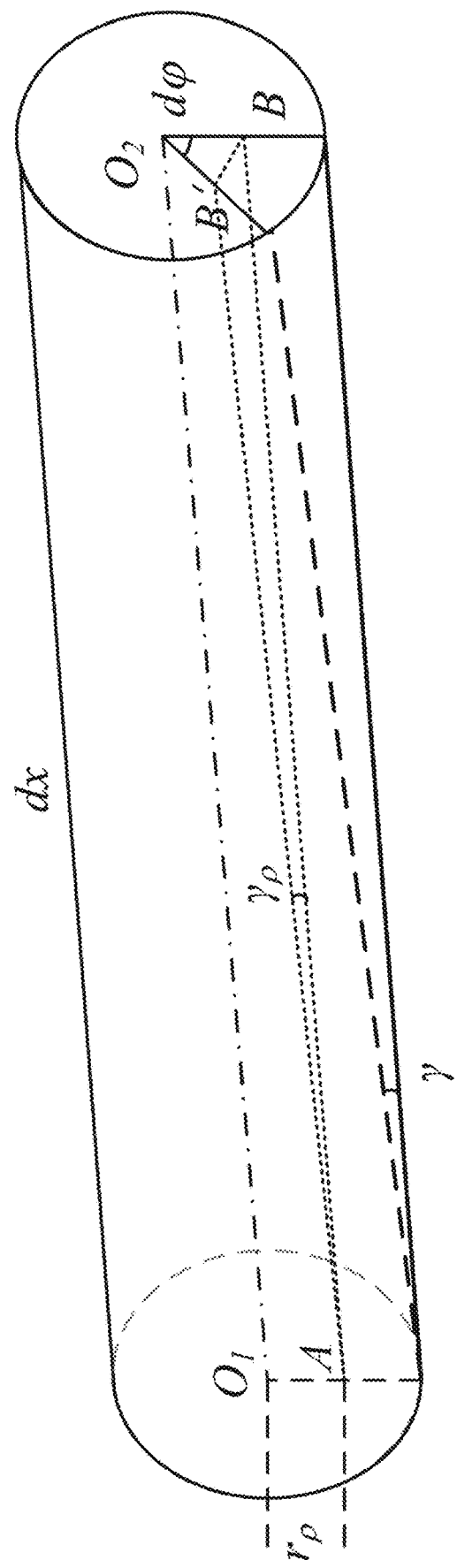
FIG. 7 is a geometric model diagram of the optical fiber Bragg grating micro-element segment under the bending and torsion condition according to the embodiment of the invention.

The length of the optical fiber shape sensor used to monitor straightness of the scraper conveyor can reach hundreds of meters, and it must be twisted during the movement of the scraper conveyor. The AB micro-element segment with a length of dx is taken and analyzed from the geometric relationship of deformation, as shown in FIG. 7. The distance between AB and $O_1O_2$ is $r_\rho$, after torsion, AB is twisted to AB', $\gamma_\rho$ is the shear angle produced by the torsion of micro-element segment AB to micro-element segment AB', $d_\varphi$ is the torsion angle produced by the end of micro-element segment AB, r is the distance between optical fiber Bragg grating 2 and centroid $O_1O_2$ of the flexible substrate 1.

The optical fiber shape sensor is twisted, and the conversion formula between the sensing strain of the optical fiber shape sensor and the bending curvature at the neutral axis is as follows:

$$\kappa = \left[\left(\frac{1}{r}+\frac{\varepsilon_\varphi}{h\eta}\right)^2 - \left(\frac{\varphi}{l}\right)^2\right]^{\frac{1}{2}} - \frac{1}{r}$$

where $\varepsilon_\varphi$ is the sensing strain of the optical fiber shape sensor after torsion, $\varphi$ is the torsion angle, r is the distance between the optical fiber Bragg grating 2 and the center line of the flexible substrate 1, and l is the length of the micro-element segment AB.

In an example of the invention, in S30, the linear interpolation method is used to insert multiple interpolation nodes between the curvature values of two adjacent grating measuring points, including the following:

firstly, the curvature array on the horizontal plane is denoted as $\kappa_H$, and the arc length array is denoted as $s_H$, the curvature array on the vertical plane is denoted as $\kappa_V$, and the arc length array is denoted as $s_V$; that is:

$$\begin{cases} \kappa_H = [\kappa_{H1}, \kappa_{H2}, \kappa_{H3} \ldots, \kappa_{Hi} \ldots \kappa_{Hn}] \\ s_H = [s_{H1}, s_{H2}, s_{H3} \ldots, s_{Hi} \ldots s_{Hn}] \end{cases}$$

$$\begin{cases} \kappa_V = [\kappa_{V1}, \kappa_{V2}, \kappa_{V3} \ldots, \kappa_{Vi} \ldots \kappa_{Vn}] \\ s_V = [s_{V1}, s_{V2}, s_{V3} \ldots, s_{Vi} \ldots s_{Vn}] \end{cases}$$

then, after interpolation, the interpolation nodes are inserted between the curvature values of the original grating measuring points, and all the curvature values and arc length values after interpolation in a horizontal plane XOY and a vertical plane XOZ are obtained, the expression is as follows:

$$\begin{cases} \kappa_H' = [\kappa_{H1}, \kappa_{H11}, \kappa_{H12} \ldots, \kappa_{Hm1}, \kappa_{H2}, \kappa_{H21}, \kappa_{H22} \ldots, \\ \kappa_{Hm2} \ldots, \kappa_{Hi}, \kappa_{Hi1}, \kappa_{Hi2} \ldots, \kappa_{Hmi}, \ldots \kappa_{Hn}] \\ s_H' = [s_{H1}, s_{H11}, s_{H12} \ldots, s_{Hm1}, s_{H2}, s_{H21}, s_{H22} \ldots, \\ s_{Hm2} \ldots, s_{Hi}, s_{Hi1}, s_{Hi2} \ldots, s_{Hmi}, \ldots s_{Hn}] \end{cases}$$

$$\begin{cases} \kappa_V' = [\kappa_{V1}, \kappa_{V11}, \kappa_{V12} \ldots, \kappa_{Vm1}, \kappa_{V2}, \kappa_{V21}, \kappa_{V22} \ldots, \\ \kappa_{Vm2} \ldots, \kappa_{Vi}, \kappa_{Vi1}, \kappa_{Vi2} \ldots, \kappa_{Vmi}, \ldots \kappa_{Vn}] \\ s_V' = [s_{V1}, s_{V11}, s_{V12} \ldots, s_{Vm1}, s_{V2}, s_{V21}, s_{V22} \ldots, \\ s_{Vm2} \ldots, s_{Vi}, s_{Vi1}, s_{Vi2} \ldots, s_{Vmi}, \ldots s_{Vn}] \end{cases}$$

where $x_H'$ is the curvature array on the horizontal plane after interpolation, and $s_H'$ is the arc length array on the horizontal plane after interpolation; $\kappa_V'$ is the curvature array on the vertical plane after interpolation, and $s_V'$ is the arc length array on the vertical plane after interpolation.

It should be noted that due to the limitation of the number of measurement points of the optical fiber Bragg grating sensing unit, the curvature data of the spatial discrete distribution is calculated after the sampling of the optical fiber optic analyzer, in order to be able to fit a more accurate curve shape, more curvature data need to be added by interpolation method. The commonly used interpolation methods include linear interpolation method, polynomial interpolation method, and B-spline interpolation method, in this embodiment, it is considered that the scraper conveyor is connected by a section of the middle groove through the pin shaft, the linear interpolation method can not only reduce the amount of calculation but also meet the requirements of engineering use.

In an example of the invention, before S40, it also includes:
the coordinate value of the starting point of the optical fiber shape sensor is determined, and the tangent slope and curvature of the starting point of the optical fiber shape sensor are determined by an initial calibration of the optical fiber shape sensor, the tangent slope of the ith point and the arc length between the ith point and the (i+1)th point are known, and the tangent slope of the (i+1)th point is calculated, where the calculation formula of the tangent slope of the (i+1)th point is as follows:

$$k_{H(i+1)} = \tan[\kappa_{Hi}\Delta s_i + \arctan(k_{Hi})]$$

where $\kappa_{Hi}$ is the curvature of the ith point, $k_{Hi}$ is the tangent slope of the ith point, $\Delta s_i$ is the arc length between the ith point and the (i+1)th point, and $k_{H(i+1)}$ is the slope of the (i+1)th point.

Figure 8:
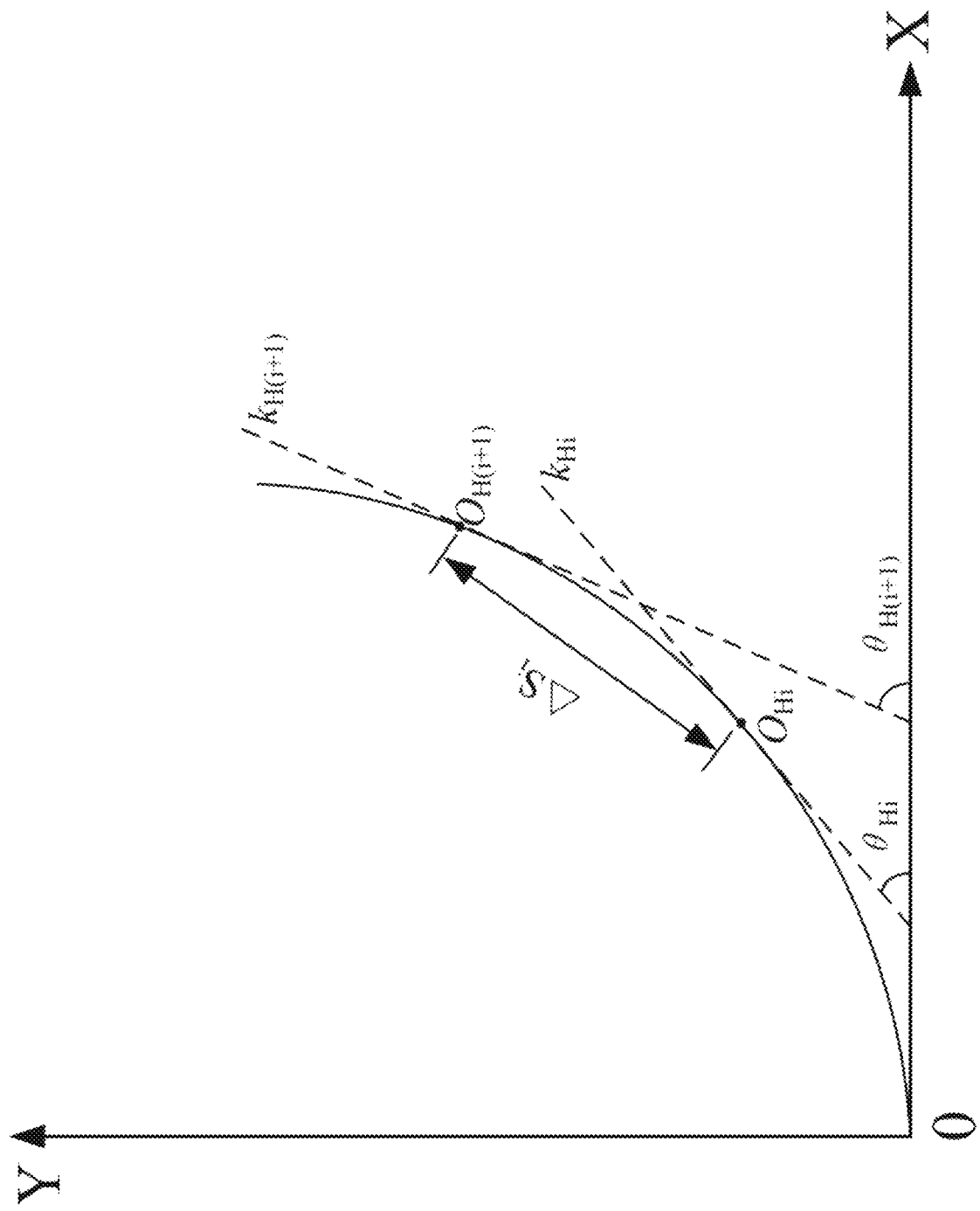
FIG. 8 is a schematic diagram of the XY plane slope recursion algorithm based on the embodiment of the invention.
Figure 9:
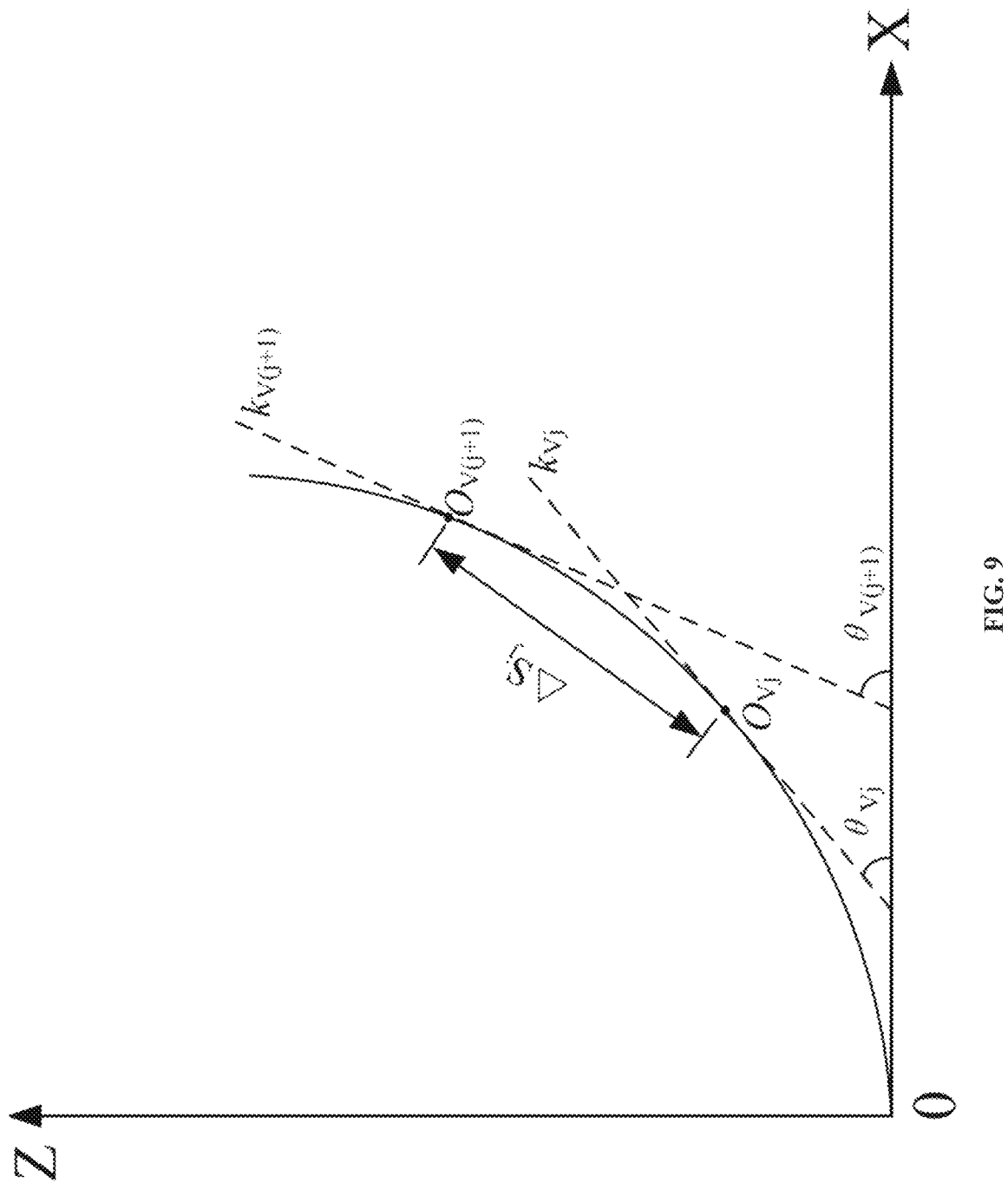
FIG. 9 is a schematic diagram of the XZ plane slope recursion algorithm based on the embodiment of the invention.

In an example of the invention, S40 includes the following steps:

As shown in FIG. 8, assuming the curvatures of the ith point and the (i+1)th point on the horizontal plane XOY are $\kappa_{Hi}$ and $\kappa_{H(i+1)}$ respectively, the slopes are $k_{Hi}$ and $k_{H(i+1)}$ respectively, and the coordinates are $(x_{Hi}, y_{Hi})$, $(x_{H(i+1)}, y_{H(i+1)})$ respectively; the angles between the tangent slope of the two points and the x-axis are $\theta_{Hi}$, $\theta_{H(i+1)}$, respectively; $\Delta\theta_{Hi}$ is the change value of the tangential angles of the two points; $\Delta s_i$ is the arc length between two points;

the angle $\theta_{Hi}$ between the tangent slope of the ith point and the x-axis, the angle $\theta_{H(i+1)}$ between the tangent slope of the (i+1)th point and the x-axis, the change value $\Delta\theta_{Hi}$ of the tangential angle of the two points, and the arc length $\Delta s_i$ between the two points can be obtained as follows:

$$\begin{cases} \theta_{Hi} = \arctan(k_{Hi}) \\ \theta_{H(i+1)} = \arctan(k_{H(i+1)}) \\ \Delta\theta_{Hi} = \theta_{H(i+1)} - \theta_{Hi} \\ \kappa_{Hi} = \dfrac{\Delta\theta_{Hi}}{\Delta s_i} \end{cases}$$

from the above formula, the slope of the $(i+1)^{th}$ point can be recursively obtained:

$$k_{H(i+1)} = \tan[\kappa_{Hi}\Delta s_i + \arctan(k_{Hi})]$$

a coordinate change from the ith point to the $(i+1)^{th}$ point is calculated as:

$$\begin{cases} \Delta x_{Hi} = \dfrac{\Delta s_i}{\sqrt{1+k_{Hi}^2}} \\ \Delta y_{Hi} = \dfrac{k_{Hi}\Delta s_i}{\sqrt{1+k_{Hi}^2}} \end{cases}$$

from the above formula, the coordinates of the (i+1)th point are as follows:

$$\begin{cases} x_{H(i+1)} = x_{Hi} + \Delta x_i = x_{Hi} + \dfrac{\Delta s_i}{\sqrt{1+k_{Hi}^2}} \\ y_{H(i+1)} = y_{Hi} + \Delta y_i = y_{Hi} + \dfrac{k_{Hi}\Delta s_i}{\sqrt{1+k_{Hi}^2}} \end{cases}$$

the first measuring point on the horizontal plane XOY is taken as the coordinate origin, that is $(x_1, y_1)=(0,0)$, the coordinate set $\{(x_1, y_1), (x_2, y_2) \ldots, (x_w, y_w)\}$ of other points on the XOY plane is obtained recursively, finally, the points are connected by a smooth curve, and the reconstruction curve of the horizontal plane XOY is obtained;

similarly, as shown in FIG. 9, the $(j+1)^{th}$ point coordinate of the vertical plane XOZ is recursively obtained as follows:

$$\begin{cases} x_{V(j+1)} = x_{Vj} + \Delta x_j = x_{Vj} + \dfrac{\Delta s_j}{\sqrt{1+k_{Vj}^2}} \\ z_{V(j+1)} = z_{Vj} + \Delta z_j = z_{Vj} + \dfrac{k_{Vj}\Delta s_j}{\sqrt{1+k_{Vj}^2}} \end{cases}$$

the first measuring point on the vertical plane XOZ is taken as the coordinate origin, that is, $(x_1, z_1)=(0, 0)$, the coordinate set $\{(x_1, z_1), (x_2, z_2) \ldots, (x_w, z_w)\}$ of other points on the XOZ plane is obtained recursively, finally, the points are connected by a smooth curve, and a reconstruction curve of the horizontal plane XOZ is obtained;

the coordinate values of the grating measuring point and the three-dimensional space XYZ of the interpolation node are obtained by superimposing the corresponding coordinate points on the horizontal plane XOY and the vertical plane XOZ.

Based on this, the coordinate set $\{(x_1, y_1, z_1), (x_2, y_2, z_2) \ldots, (x_w, y_w, z_w)\}$ of each point in the three-dimensional space is obtained recursively, finally, the points are connected by a smooth curve, and the reconstruction curve of the three-dimensional space obtained.

The two-dimensional coordinates $(x_i, y_i)$ and $(x_i, z_i)$ of each grating measuring point and interpolation node can be obtained by reconstructing the above two sets of plane curves, regardless of the stretching, compression, and torsion of the optical fiber shape sensor itself on the YOZ plane, or the stretching, compression and torsion of the optical fiber shape sensor, but the displacement transformation of the sensor in the YOZ plane is negligible compared with the displacement transformation of the scraper conveyor bending on the horizontal plane or undulating on the vertical plane. Therefore, the three-dimensional spatial curve shape monitored by the optical fiber shape sensor can be obtained by vector synthesis in the XOY plane and the XOZ plane. Based on this, the coordinate set $\{(x_1, y_1, z_1), (x_2, y_2, z_2) \ldots, (x_w, y_w, z_w)\}$ of each point in the three-dimensional space is obtained recursively, finally, the points are connected by a smooth curve, and the reconstruction curve of the three-dimensional space obtained.

According to the second aspect of the invention, an optical fiber sensing system for straightness of the scraper conveyor, including:

a strain detection module, it is configured to lay the optical fiber shape sensor along the scraper conveyor, and the horizontal strain and vertical strain of the corresponding grating measuring point of the scraper conveyor are obtained by the optical fiber shape sensor; where the optical fiber shape sensor includes a flexible substrate 1, an optical fiber Bragg grating 2 and a packaging material 3, the optical fiber Bragg grating 2 is fixedly encapsulated on the surface of the flexible substrate 1 through the packaging material 3;

a curvature calculation module, it is configured to calculate the horizontal curvature and vertical curvature of the grating measuring point according to the conversion formula of the sensing strain of the optical fiber shape sensor and the bending curvature of the neutral axis of the flexible substrate 1;

an interpolation calculation module, it is configured to insert multiple interpolation nodes between the curvature values of two adjacent grating measuring points by a discrete interpolation algorithm;

a coordinate calculation module, it is configured to convert each horizontal curvature and each vertical curvature into the horizontal coordinate value in the horizontal coordinate system and the vertical coordinate value in the vertical coordinate system respectively through the slope recursion algorithm, the horizontal coordinate value is superimposed with the vertical coordinate value to obtain the three-dimensional space coordinate value of the grating measuring point and the interpolation node;

a curve fitting module, it is configured to obtain the curve of the optical fiber shape sensor on the horizontal plane by fitting the horizontal coordinate value, the curve of the optical fiber shape sensor on the vertical plane is obtained by fitting the vertical coordinate value, the three-dimensional space curve of the optical fiber shape sensor is obtained by fitting the three-dimensional space coordinate value.

The sensing system is based on optical fiber shape sensing technology to monitor the shape of the scraper conveyor in real-time, the discrete interpolation algorithm and slope recursion algorithm are used to realize the gradual conversion of optical fiber center wavelength-strain-bending curvature-measuring point coordinates, the optical fiber Bragg grating has high sensing accuracy and the curve reconstruction algorithm is scientific and reasonable, which realizes the real-time and high-precision monitoring of the shape of scraper conveyor.

In an example of the invention, the curvature calculation module includes:

a strain-curvature conversion unit, it is configured to convert the sensing strain of the optical fiber shape sensor to the bending curvature of the neutral axis of the flexible substrate, where the conversion formula is:

$$\varepsilon = h \cdot \kappa \cdot \eta$$

where $\varepsilon$ is the sensing strain of the optical fiber shape sensor, h is the vertical distance from the grating measuring point to the neutral axis of the flexible substrate 1, $\eta$ is the strain transfer efficiency of the optical fiber shape sensor, and $\kappa$ is the curvature of the neutral axis of the flexible substrate 1.

As shown in FIG. 5, the principle of optical fiber Bragg grating curvature measurement is based on the pure bending force model, and the influence of rotation and torsion deformation on the sensor itself is not considered. The relationship between the axial strain of the optical fiber Bragg grating sensing unit and the bending curvature of the neutral axis is as follows:

$$\varepsilon = h \cdot \kappa \cdot \eta$$

where $\varepsilon$ is the sensing strain of the optical fiber shape sensor, h is the vertical distance from the grating measuring point to the neutral axis of the flexible substrate 1, $\eta$ is the strain transfer efficiency of the optical fiber shape sensor, and $\kappa$ is the curvature of the neutral axis of the flexible substrate 1; In FIG. 5, the vertical distance from FBG1 to the neutral axis of flexible substrate 1 is $h_1$, and the vertical distance from FBG2 to the neutral axis of flexible substrate 1 is $h_2$.

The above reference to the preferred embodiment describes in detail the optical fiber sensing method for straightness of the scraper conveyor and the demonstration implementation method of the sensing system proposed by the invention. However, the technical personnel in this field can understand that without deviating from the concept of the invention, the above specific embodiments can be made a variety of variants and modifications, and the various technical features and structures proposed by the invention can be combined in a variety of ways, without exceeding the scope of protection of the invention, the scope of protection of the invention is determined by the accompanying claims.

What is claimed is:

1. An optical fiber sensing system for implementing an optical fiber sensing method for a straightness of a scraper conveyor, the optical fiber sensing method comprises the following steps:

S10: setting an optical fiber shape sensor along the scraper conveyor, and obtaining a horizontal strain and a vertical strain of a grating measuring point of the scraper conveyor by the optical fiber shape sensor; wherein the optical fiber shape sensor comprises a flexible substrate, an optical fiber Bragg grating and a packaging material, and the optical fiber Bragg grating is fixedly encapsulated on a surface of the flexible substrate through the packaging material;

S20: according to a conversion formula of a sensing strain of the optical fiber shape sensor and a bending curvature of a neutral axis of the flexible substrate, calculating a horizontal curvature and a vertical curvature of the grating measuring point;

S30: inserting a plurality of interpolation nodes between curvature values of two adjacent grating measuring points by a discrete interpolation algorithm;

S40: through a slope recursion algorithm, converting each horizontal curvature and each vertical curvature into a horizontal coordinate value in a horizontal coordinate system and a vertical coordinate value in a vertical coordinate system respectively, and superimposing the horizontal coordinate value with the vertical coordinate value to obtain a three-dimensional space coordinate value of the grating measuring point and the interpolation node; and S50: obtaining a curve of the optical fiber shape sensor on a horizontal plane by fitting the horizontal coordinate value, obtaining a curve of the optical fiber shape sensor on a vertical plane by fitting the vertical coordinate value, and obtaining a three-dimensional space curve of the optical fiber shape sensor by fitting the three-dimensional space coordinate value;

wherein the step S50 comprises obtaining the straightness of the scraper conveyor such that the straightness of the scraper conveyor is obtained by performing the obtaining the curve of the optical fiber shape sensor on the horizontal plane, the obtaining the curve of the optical fiber shape sensor on the vertical plane, and the obtaining the three-dimensional space curve of the optical fiber shape sensor by fitting the three-dimensional space coordinate value; and the optical fiber sensing system comprising:

the optical fiber shape sensor disposed along the scraper conveyor;

a curvature calculation module, wherein the curvature calculation module is configured to perform the step S20;

an interpolation calculation module, wherein the interpolation calculation module is configured to perform the step S30;

a coordinate calculation module, wherein the coordinate calculation module is configured to perform the step S40; and a curve fitting module, wherein the curve fitting module is configured to perform the step S50.

2. The optical fiber sensing system according to claim 1, wherein in the S20, when the optical fiber shape sensor bends, the conversion formula between the sensing strain of the optical fiber shape sensor and the bending curvature of the neutral axis of the flexible substrate is as follows:

$\varepsilon = h \cdot \kappa \cdot \eta$ wherein $\varepsilon$ is the sensing strain of the optical fiber shape sensor, h is a vertical distance from the grating measuring point to the neutral axis of the flexible substrate, $\eta$ is a strain transfer efficiency of the optical fiber shape sensor, and k is the bending curvature of the neutral axis of the flexible substrate.

3. The optical fiber sensing system according to claim 1, wherein in the S20, when the optical fiber shape sensor rotates, the conversion formula between the sensing strain of the optical fiber shape sensor and the bending curvature of the neutral axis of the flexible substrate is as follows:

$$\kappa = \frac{\varepsilon_\theta}{h\eta\,\cos\theta + \varepsilon_\theta h(1 - \cos\theta)}$$

wherein $\varepsilon_\theta$ is the sensing strain of the optical fiber shape sensor after rotation, $\theta$ is a rotation angle of the optical fiber shape sensor, h is a vertical distance from the grating measuring point to the neutral axis of the flexible substrate, $\eta$ is a strain transfer efficiency of the optical fiber shape sensor, and $\kappa$ is the bending curvature of the neutral axis of the flexible substrate.

4. The optical fiber sensing system according to claim 1, wherein in the S20, when the optical fiber shape sensor is twisted, the conversion formula between the sensing strain of the optical fiber shape sensor and the bending curvature of the neutral axis of the flexible substrate is as follows:

$$\kappa = \left[\left(\frac{1}{r} + \frac{\varepsilon_\varphi}{h\eta}\right)^2 - \left(\frac{\varphi}{l}\right)^2\right]^{\frac{1}{2}} - \frac{1}{r}$$

wherein $\varepsilon_\varphi$ is the sensing strain of the optical fiber shape sensor after torsion, $\varphi$ is a torsion angle of the optical fiber shape sensor, r is a distance between the optical fiber Bragg grating and a centroid of the flexible substrate, h is a vertical distance from the grating measuring point to the neutral axis of the flexible substrate, $\eta$ is a strain transfer efficiency of the optical fiber shape sensor, and $\kappa$ is the bending curvature of the neutral axis of the flexible substrate.

5. The optical fiber sensing system according to claim 1, wherein in the S30, using a linear interpolation method to insert the plurality of interpolation nodes between the curvature values of the two adjacent grating measuring points comprises the following:

firstly, denoting a curvature array on the horizontal plane XOY as $\kappa_H$, an arc length array on the horizontal plane XOY as $s_H$, a curvature array on the vertical plane XOZ as $\kappa_V$, and an arc length array on the vertical plane XOZ as $s_V$, wherein an expression of $\kappa_H$, $s_H$, $\kappa_V$, and $s_V$ is as follows:

$$\begin{cases} \kappa_H = [\kappa_{H1}, \kappa_{H2}, \kappa_{H3} \ldots, \kappa_{Hi} \ldots \kappa_{Hn}] \\ s_H = [s_{H1}, s_{H2}, s_{H3} \ldots, s_{Hi} \ldots s_{Hn}] \end{cases}$$

$$\begin{cases} \kappa_V = [\kappa_{V1}, \kappa_{V2}, \kappa_{V3} \ldots, \kappa_{Vi} \ldots \kappa_{Vn}] \\ s_V = [s_{V1}, s_{V2}, s_{V3} \ldots, s_{Vi} \ldots s_{Vn}] \end{cases}$$

then, after an interpolation, inserting the plurality of interpolation nodes between curvature values of original grating measuring points, and obtaining all the curvature values and arc length values after the interpolation in the horizontal plane XOY and the vertical plane XOZ, wherein an expression of $\kappa_H'$, $s_H'$, $\kappa_V'$, and $s_V'$ is as follows:

$$\begin{cases} \kappa'_H = [\kappa_{H1}, \kappa_{H11}, \kappa_{H12} \ldots, \kappa_{Hm1}, \kappa_{H2}, \kappa_{H21}, \\ \kappa_{H22} \ldots, \kappa_{Hm2} \ldots, \kappa_{Hi}, \kappa_{Hi1}, \kappa_{Hi2} \ldots, \kappa_{Hmi}, \ldots \kappa_{Hn}] \\ s'_H = [s_{H1}, s_{H11}, s_{H12} \ldots, s_{Hm1}, s_{H2}, s_{H21}, \\ s_{H22} \ldots, s_{Hm2} \ldots, s_{Hi}, s_{Hi1}, s_{Hi2} \ldots, s_{Hmi}, \ldots s_{Hn}] \end{cases}$$

$$\begin{cases} \kappa'_V = [\kappa_{V1}, \kappa_{V11}, \kappa_{V12} \ldots, \kappa_{Vm1}, \kappa_{V2}, \kappa_{V21}, \\ \kappa_{V22} \ldots, \kappa_{Vm2} \ldots, \kappa_{Vi}, \kappa_{Vi1}, \kappa_{Vi2} \ldots, \kappa_{Vmi}, \ldots \kappa_{Vn}] \\ s'_V = [s_{V1}, s_{V11}, s_{V12} \ldots, s_{Vm1}, s_{V2}, s_{V21}, \\ s_{V22} \ldots, s_{Vm2} \ldots, s_{Vi}, s_{Vi1}, s_{Vi2} \ldots, s_{Vmi}, \ldots s_{Vn}] \end{cases}$$

wherein $\kappa_H'$ is a curvature array on the horizontal plane XOY after the interpolation, and $s_H'$ is an arc length array on the horizontal plane XOY after the interpolation; $\kappa_V'$ is a curvature array on the vertical plane XOZ after the interpolation, and $s_V'$ is an arc length array on the vertical plane XOZ after the interpolation.

6. The optical fiber sensing system according to claim 1, wherein
before the S40, the optical fiber sensing method further comprises:
determining a coordinate value of a starting point of the optical fiber shape sensor, determining a tangent slope and a curvature of the starting point of the optical fiber shape sensor by an initial calibration of the optical fiber shape sensor, and calculating a tangent slope of an (i+1)th point, wherein a tangent slope of an ith point and an arc length between the ith point and the (i+1)th point are known, wherein a calculation formula of the tangent slope of the (i+1)th point is as follows:

$$k_{H(i+1)} = \tan[\kappa_{Hi}\Delta s_i + \arctan(k_{Hi})]$$

wherein $\kappa_{Hi}$ is a curvature of the $i^{th}$ point, $k_{Hi}$ is the tangent slope of the $i^{th}$ point, $\Delta s_i$ is the arc length between the $i^{th}$ point and the $(i+1)^{th}$ point, and $k_{H(i+1)}$ is the tangent slope of the $(i+1)^{th}$ point.

7. The optical fiber sensing system according to claim 1, wherein
the S40 comprises the following steps:
assuming curvatures of an ith point and an (i+1)th point on the horizontal plane XOY are $\kappa_{Hi}$ and $\kappa_{H(i+1)}$ respectively, tangent slopes of the $i^{th}$ point and the $(i+1)^{th}$ point are $k_{Hi}$ and $k_{H(i+1)}$ respectively, and coordinates of the $i^{th}$ point and the $(i+1)^{th}$ point are $(x_{Hi}, y_{Hi})$, $(X_{H(i+1)}, Y_{H(i+1)})$ respectively; angles between the tangent slopes of the $i_{th}$ point and the $(i+1)^{th}$ point and an x-axis are $\theta_{Hi}$, $\theta_{H(i+1)}$, respectively; $\Delta\theta_{Hi}$ is a change value of tangential angles of the $i^{th}$ point and the $(i+1)^{th}$ point; $\Delta s_i$ is an arc length between the $i^{th}$ point and the $(i+1)^{th}$ point;
the angle $\theta_{Hi}$ between the tangent slope of the ith point and the x-axis, the angle $\theta_{H(i+1)}$ between the tangent slope of the (i+1)th point and the x-axis, the change value $\Delta\theta_{Hi}$ of the tangential angles of the $i^{th}$ point and the $(i+1)^{th}$ point, and the arc length $\Delta s_i$ between the $i^{th}$ point and the $(i+1)^{th}$ point are obtained as follows:

$$\begin{cases} \theta_{Hi} = \arctan(k_{Hi}) \\ \theta_{H(i+1)} = \arctan(k_{H(i+1)}) \\ \Delta\theta_{Hi} = \theta_{H(i+1)} - \theta_{Hi} \\ \kappa_{Hi} = \dfrac{\Delta\theta_{Hi}}{\Delta s_i} \end{cases}$$

from a first formula above, the tangent slope of the $(i+1)^{th}$ point is recursively obtained:

$$k_{H(i+1)} = \tan[\kappa_{Hi}\Delta s_i + \arctan(k_{Hi})]$$

a coordinate change from the ith point to the $(i+1)^{th}$ point is calculated as:

$$\begin{cases} \Delta x_{Hi} = \dfrac{\Delta s_i}{\sqrt{1+k_{Hi}^2}} \\ \Delta y_{Hi} = \dfrac{k_{Hi}\Delta s_i}{\sqrt{1+k_{Hi}^2}} \end{cases}$$

from a second formula above, the coordinates of the (i+1)th point are:

$$\begin{cases} x_{H(i+1)} = x_{Hi} + \Delta x_i = x_{Hi} + \dfrac{\Delta s_i}{\sqrt{1+k_{Hi}^2}} \\ y_{H(i+1)} = y_{Hi} + \Delta y_i = y_{Hi} + \dfrac{k_{Hi}\Delta s_i}{\sqrt{1+k_{Hi}^2}} \end{cases}$$

similarly, coordinates of a $(j+1)^{th}$ point of the vertical plane XOZ are recursively obtained as follows:

$$\begin{cases} x_{V(j+1)} = x_{Vj} + \Delta x_j = x_{Vj} + \dfrac{\Delta s_j}{\sqrt{1+k_{Vj}^2}} \\ z_{V(j+1)} = z_{Vj} + \Delta z_j = z_{Vj} + \dfrac{k_{Vj}\Delta s_j}{\sqrt{1+k_{Vj}^2}} \end{cases}$$

obtaining coordinate values of the grating measuring point and a three-dimensional space XYZ of the interpolation node by superimposing corresponding coordinate points on the horizontal plane XOY and the vertical plane XOZ.

8. The optical fiber sensing system according to claim 1, wherein
the S50 comprises the following steps:
taking a first measuring point on the horizontal plane XOY as a first coordinate origin, wherein the first coordinate origin is $(x_1, y_1)=(0,0)$, obtaining a first coordinate set $\{(x_1, y_1), (x_2, y_2) \ldots, (x_w, y_w)\}$ of other points on the horizontal plane XOY recursively, finally, connecting points in the first coordinate set by a first smooth curve, and obtaining a reconstruction curve of the horizontal plane XOY;
taking a first measuring point on the vertical plane XOZ as a second coordinate origin, wherein the second coordinate origin is $(x_1, z_1)=(0, 0)$, obtaining a second coordinate set $\{(x_1, z_1), (x_2, z_2) \ldots, (x_w, z_w)\}$ of other points on the vertical plane XOZ recursively, finally, connecting points in the second coordinate set by a second smooth curve, and obtaining a reconstruction curve of the vertical plane XOZ; and
by superimposing the corresponding coordinate points on the horizontal plane XOY and the vertical plane XOZ, obtaining a third coordinate set $\{(x_1, y_1, z_1), (x_2, y_2, z_2) \ldots, (x_w, y_w, z_w)\}$ of each point in the three-dimensional space XYZ recursively, finally, connecting points in the third coordinate set by a third smooth curve, and obtaining a reconstruction curve of the three-dimensional space XYZ.

9. The optical fiber sensing system according to claim 1, wherein the curvature calculation module comprises:
a strain-curvature conversion unit, wherein the strain-curvature conversion unit is configured to convert the sensing strain of the optical fiber shape sensor to the bending curvature of the neutral axis of the flexible substrate, wherein a conversion formula is:

$$\varepsilon = h \cdot \kappa \cdot \eta$$

wherein $\varepsilon$ is the sensing strain of the optical fiber shape sensor, h is a vertical distance from the grating measuring point to the neutral axis of the flexible substrate, $\eta$ is a strain transfer efficiency of the optical fiber shape sensor, and $\kappa$ is the bending curvature of the neutral axis of the flexible substrate.

* * * * *